(12) United States Patent
Hase et al.

(10) Patent No.: US 9,663,631 B2
(45) Date of Patent: May 30, 2017

(54) PHOTOSENSITIVE THERMOPLASTIC RESIN COMPOSITION AND MOLDED PRODUCT USING SAME

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP); KYUSHU UNIVERSITY, Fukuoka-shi, Fukuoka (JP)

(72) Inventors: Tatsuya Hase, Yokkaichi (JP); Makoto Mizoguchi, Fukuoka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, Fukuoka-shi (JP)

( * ) Notice: Subject to any disclaimer, the term of this patent is extended or adjusted under 35 U.S.C. 154(b) by 0 days.

(21) Appl. No.: 14/398,798

(22) PCT Filed: May 9, 2013

(86) PCT No.: PCT/JP2013/063044
§ 371 (c)(1),
(2) Date: Nov. 4, 2014

(87) PCT Pub. No.: WO2013/172246
PCT Pub. Date: Nov. 21, 2013

(65) Prior Publication Data
US 2015/0087740 A1    Mar. 26, 2015

(30) Foreign Application Priority Data
May 16, 2012 (JP) ................... 2012-112236

(51) Int. Cl.

| | |
|---|---|
| C08K 5/11 | (2006.01) |
| C08F 2/38 | (2006.01) |
| C08F 2/46 | (2006.01) |
| C08F 2/48 | (2006.01) |
| C08J 3/24 | (2006.01) |
| C08J 3/28 | (2006.01) |
| B29C 71/04 | (2006.01) |
| B29C 35/08 | (2006.01) |
| C08F 220/14 | (2006.01) |
| C08F 220/20 | (2006.01) |

(Continued)

(52) U.S. Cl.
CPC ............ *C08K 5/11* (2013.01); *B29C 35/0805* (2013.01); *B29C 71/04* (2013.01); *C08F 2/38* (2013.01); *C08F 2/48* (2013.01); *C08J 3/24* (2013.01); *C08J 3/28* (2013.01); *B29C 2035/0827* (2013.01); *B29C 2035/0833* (2013.01); *B29K 2033/08* (2013.01); *B29K 2105/0005* (2013.01); *B29K 2105/24* (2013.01); *C08F 220/14* (2013.01); *C08F 220/20* (2013.01); *C08F 2220/1875* (2013.01); *C08F 2222/1013* (2013.01); *C08F 2222/1026* (2013.01); *C08J 2323/12* (2013.01); *C08J 2327/06* (2013.01); *C08J 2333/12* (2013.01)

(58) Field of Classification Search
CPC .. C08F 2/04; C08F 2/50; C08F 220/14; C08F 220/20; C08F 2220/1875; C08F 2222/1013; C08F 2222/1026; C08F 2/38; C08J 3/28; C08J 3/24; C08J 2323/12; C08J 2327/06; C08J 2333/12; B29C 5/11; B29C 71/04; B29C 35/0805; B29C 2035/0827; B29C 2033/08; B29C 2105/0005; B29C 2105/24; C08K 5/08
See application file for complete search history.

(56) References Cited

U.S. PATENT DOCUMENTS

| | | |
|---|---|---|
| 3,652,275 A | 3/1972 | Baum et al. |
| 4,402,887 A | 9/1983 | Kuriyama et al. |

(Continued)

FOREIGN PATENT DOCUMENTS

| | | |
|---|---|---|
| CN | 1055071 A | 10/1991 |
| CN | 102414947 A | 4/2012 |

(Continued)

OTHER PUBLICATIONS

Sep. 30, 2015 Office Action issued in Chinese Patent Application No. 201380025278.8.

(Continued)

*Primary Examiner* — Sanza McClendon
(74) *Attorney, Agent, or Firm* — Oliff PLC

(57) ABSTRACT

A photosensitive thermoplastic resin composition that can be melt-molded to provide a molded product and can be crosslinked by irradiation of the molded product with light, and a molded product made of the same. The photosensitive thermoplastic resin composition contains a thermoplastic polymer and a photocrosslinking agent compatible with the thermoplastic polymer. The composition is melt-moldable, and a melt-molded product of the composition is crosslinkable by irradiation of light. The composition is melt-molded into a given shape to provide a molded product, and the molded product is photocrosslinked by irradiation of light.

10 Claims, 2 Drawing Sheets

(51) Int. Cl.
    *C08F 220/18* (2006.01)
    *C08F 222/10* (2006.01)
    *B29K 33/00* (2006.01)
    *B29K 105/00* (2006.01)
    *B29K 105/24* (2006.01)

(56) References Cited

U.S. PATENT DOCUMENTS

| 5,043,237 A | 8/1991 | Blanchet-Fincher et al. |
| 5,767,212 A | 6/1998 | Iguchi et al. |
| 6,380,314 B1 * | 4/2002 | Soane ............ C08F 257/02 525/242 |

FOREIGN PATENT DOCUMENTS

| EP | 2 432 092 A1 | 3/2012 |
| JP | A-55-142015 | 11/1980 |
| JP | A-5-301971 | 11/1993 |
| JP | A-6-73131 | 3/1994 |
| JP | A-9-249721 | 9/1997 |
| JP | A-2000-212291 | 8/2000 |
| JP | A-2002-97216 | 4/2002 |
| JP | A-2002-347108 | 12/2002 |
| JP | A-2004-98635 | 4/2004 |
| JP | A-2006-131720 | 5/2006 |

OTHER PUBLICATIONS

Jun. 1, 2015 Office Action issued in Chinese Application No. 201380025278.8.

May 19, 2015 Office Action issued in Japanese Application No. 2012-112236.

Mar. 23, 2016 Office Action issued in Chinese Patent Application No. 201380025278.8.

Sep. 26, 2016 Office Action issued in Chinese Application No. 201380025278.8.

International Search Report issued in International Application No. PCT/JP2013/063044 mailed Aug. 13, 2013.

\* cited by examiner

PHOTOSENSITIVE THERMOPLASTIC RESIN COMPOSITION AND MOLDED PRODUCT USING SAME

TECHNICAL FIELD

The present invention relates to a photosensitive thermoplastic resin composition that is used as a material to form a molded product by hot molding and is curable with light such as ultraviolet, and a molded product made of the same.

BACKGROUND ART

A thermoplastic resin is used as a material to form various kinds of molded products because of moldability thereof. However, the thermoplastic resin is softened at around the melting point thereof, and accordingly a molded product made of a thermoplastic resin having high moldability may be used only at a low temperature. Meanwhile, an engineering plastic, which has characteristically high strength, generally has a high melting point. However, the engineering plastic requires to be heated at a high temperature for molding, and thus special attentions have to be paid to its workability and safety on the molding.

Thus, if a thermoplastic resin can be molded at a relatively low temperature where processing of the resin is relatively easy and if the heat resistance and strength of the resin can be increased by a certain treatment after molding, the resin provides both excellent workability in molding and high material functions.

A general method to provide a thermoplastic resin having both excellent workability in molding and high material functions is crosslinking among polymer molecules. Examples of the crosslinking include electron-beam crosslinking and silane crosslinking (see Patent Literatures 1-4).

In the electron-beam crosslinking, as shown in Patent Literature 1, a resin such as a polyethylene is molded into a desired shape, and then the molded product is irradiated with an electron beam, whereby polymer chains are crosslinked radically. By the crosslinking, heat resistance and strength are imparted to the resin. However, this method requires a large-scale equipment including an electron beam source and an adequate electron beam shield.

In the silane crosslinking, as shown in Patent Literatures 2-4, a resin composition prepared by melt-kneading of ingredients such a polyolefin-based polymer and a silanol catalyst is kneaded and extrusion-molded with a silane-crosslinkable polyolefin, to provide a molded product. Then, the molded product is brought into contact with moisture and thus is crosslinked. However, including the contact of the molded product with moisture, this method can not be applied to a system containing a material that may be deteriorated by moisture. Further, curing of the composition proceeds so slowly in the method that the method is not suitably used for a short-time treatment.

Ultraviolet-irradiation crosslinking is a method that completes crosslinking in a short time like the electron-beam crosslinking but does not require a large-scale equipment. In this method, a compound that is radically polymerized by ultraviolet irradiation (i.e., an ultraviolet crosslinking agent) is dispersed in a composition containing a polymer, and radicals generated by ultraviolet irradiation crosslinks polymer molecules adjacent to each other directly or crosslinks polymer molecules via a radical-polymerized product of the ultraviolet crosslinking agent.

Examples of a thermoplastic resin composition to be molded through the ultraviolet-irradiation crosslinking include a composition containing a thermoplastic resin, a (meth)acrylate derivative, and an ultraviolet crosslinking agent. If the composition can be hot-molded at a molding temperature of the thermoplastic resin to provide a molded product, and if the heat resistance and strength of the molded product can be increased by ultraviolet crosslinking through irradiation with ultraviolet, the composition provides both excellent workability in molding and high material properties.

CITATION LIST

Patent Literature

Patent Literature 1: JP Hei05-301971 A
Patent Literature 2: JP 2004-098635 A
Patent Literature 3: JP 2000-212291 A
Patent Literature 4: JP 2006-131720 A

SUMMARY OF INVENTION

Technical Problem

However, ultraviolet light does not have so high penetration into materials as an electron beam. Thus, the ultraviolet-irradiation crosslinking is hard to proceed in a deep portion of a material. Further, the ultraviolet crosslinking agent has such a high activity that a certain amount of heat causes a thermal self-curing reaction of the agent even without light irradiation.

Especially, the (meth)acrylate derivative, which is widely used as a compound that undergoes radical polymerization through irradiation with light such as ultraviolet, has high activity, and undergoes the thermal self-curing reaction at 130° C. to 180° C. Further, if a photopolymerization initiator or a catalyst (such as a chain transfer agent) is mixed in the ultraviolet crosslinking agent, the agent undergoes the thermal self-curing reaction at a still lower temperature.

Since a thermoplastic resin requires to be heated for molding, the heat applied for the molding may cause the thermal self-curing of the ultraviolet crosslinking agent in the composition. If the thermal self-curing reaction occurs in the molded product made of the composition, the composition may not be softened at a usual molding temperature, whereby become impossible to be molded, or a material produced by the thermal self-curing may be separated in the molded product. Thus, ultraviolet-irradiation crosslinking of a composition containing a thermoplastic resin has conventionally been too difficult to be used practically.

An object of the present invention is to overcome the problems in the conventional technique described above and to provide a photosensitive thermoplastic resin composition that can be melt-molded to provide a molded product and can be crosslinked by irradiation of the molded product with light, and a molded product made of the same.

Solution to Problem

To achieve the objects and in accordance with the purpose of the present invention, a photosensitive thermoplastic resin composition according to a preferred embodiment of the present invention contains a thermoplastic polymer and a photocrosslinking agent compatible with the thermoplastic polymer, the composition being melt-moldable, and a melt-molded product of the composition being crosslinkable by photoirradiation.

In the photosensitive thermoplastic resin composition, it is preferable that the thermoplastic polymer and the photocrosslinking agent are mixed at a temperature that is equal to or higher than a glass transition temperature of the thermoplastic polymer and equal to or lower than 130° C., and the photocrosslinking agent is stabilized.

It is also preferable that the thermoplastic polymer has a polar structure.

The photocrosslinking agent preferably contains a (meth) acrylate compound, a photopolymerization initiator, and a chain transfer agent.

A mass content ratio of the thermoplastic polymer to the photocrosslinking agent is preferably in a range from 99:1 to 30:70.

In another aspect of the present invention, a molded product according to a preferred embodiment of the present invention is made by melt-molding of the photosensitive thermoplastic resin composition described above into a given shape, and is photocrosslinkable.

Yet, in another aspect of the present invention, a molded product according to a preferred embodiment of the present invention is made by melt-molding of the photosensitive thermoplastic resin composition described above into a given shape and by subsequent photopolymerization of the composition.

Advantageous Effects of Invention

The photosensitive thermoplastic resin composition according the preferred embodiment of the present invention contains the thermoplastic polymer and the photocrosslinking agent that is compatible with the thermoplastic polymer. The composition is melt-moldable, and the melt-molded product of the composition is crosslinkable by photoirradiation. Thus, a molded product can be produced by melt-molding of the composition. Further, the molded product can be crosslinked by photoirradiation. Thus, the composition provides both excellent workability in molding and high material properties.

DESCRIPTION OF EMBODIMENTS

A detailed description of a preferred embodiment of the present invention will now be provided. A photosensitive thermoplastic resin composition contains (A) a thermoplastic polymer and (B) a photocrosslinking agent compatible with the thermoplastic polymer. They are premixed and in a compatible state. In an example of the preferred embodiment of the present invention, a thermoplastic polymer having a glass transition temperature (Tg) lower than 130° C. is used as the thermoplastic polymer (A), and an ultraviolet crosslinking agent containing a (meth)acrylate compound, photopolymerization initiator, and a chain transfer agent is used as the photocrosslinking agent (B).

The thermoplastic polymer and the ultraviolet crosslinking agent are premixed at a temperature equal to or higher than the Tg of the thermoplastic polymer and equal to or lower than 130° C. Since the temperature during the premixing is within the range, the ultraviolet crosslinking agent is brought into a well compatible state with the thermoplastic polymer, and a self-curing temperature of the ultraviolet crosslinking agent is significantly increased. In the compatible state, the thermoplastic polymer and the ultraviolet crosslinking agent are mixed so homogeneously as to avoid phase separation. Formation of the compatible state can be recognized through visual observation.

Figure 1:
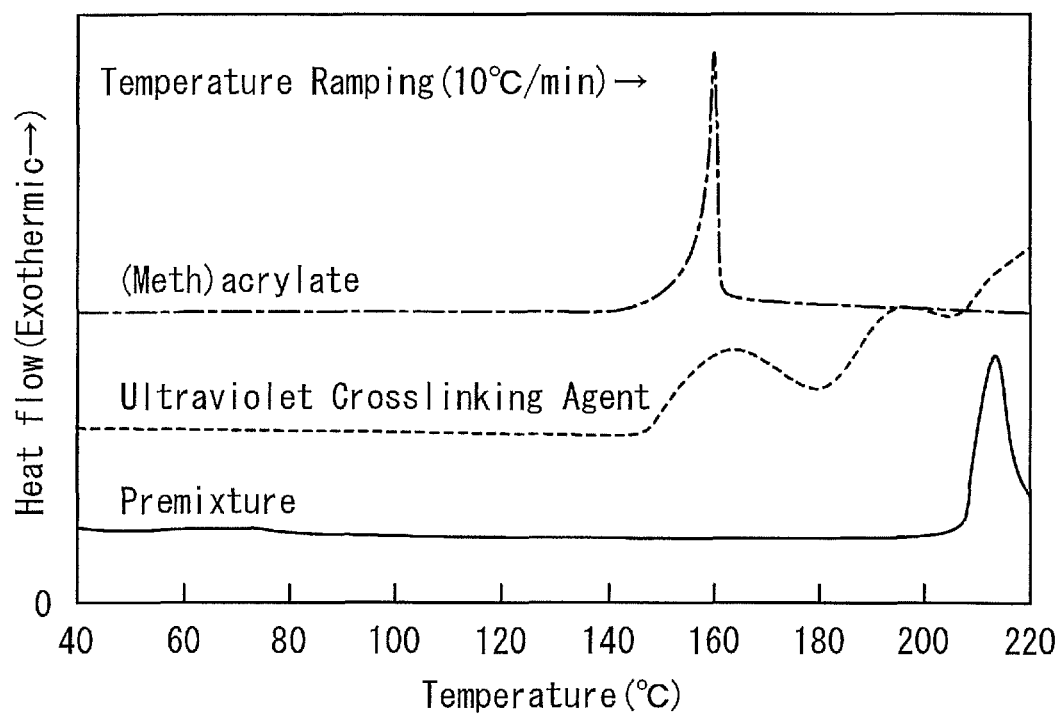
FIG. 1 is a chart showing results of temperature-ramping differential scanning calorimetry (DSC) measurements for a (meth)acrylate compound, an ultraviolet crosslinking agent, and a premixture of the ultraviolet crosslinking agent and a thermoplastic polymer.

FIG. 1 is a chart showing results of temperature-ramping differential scanning calorimetry (DSC) measurements for the (meth)acrylate compound, the ultraviolet crosslinking agent, and a premixture of the ultraviolet crosslinking agent and the thermoplastic polymer. In the DSC measurements, dipropyleneglycol diacrylate (DPGA) was used as the (meth)acrylate, the composition according to Preparation Example B-2 described in Example below [i.e., a mixture of DPGA, 1-hydroxycyclohexyl phenyl ketone (HCHPK), and chain transfer agent (B-iii) according to Synthesis Example 1] was used as the ultraviolet crosslinking agent, and a polyvinyl chloride resin (PVC) was used as the thermoplastic polymer. The PVC has a Tg of 88° C. The premixture was prepared by mixing of the ingredients at 90° C.

The peaks observed in the chart in FIG. 1 each correspond to generation of exothermic heat by self-curing during heating of the samples on an aluminum pan. The peaks of the (meth)acrylate and the ultraviolet crosslinking agent each alone are observed around 150° C. in the chart in FIG. 1. This result shows that self-curing of each of the (meth)acrylate and the ultraviolet crosslinking agent alone starts around 150° C. Meanwhile, the exothermic peak of the premixture in which the ultraviolet crosslinking agent is mixed with the PVC is observed above 200° C. This result shows that stability of the ultraviolet crosslinking agent is increased by the premixing of the agent and PVC, whereby the starting temperature of the self-curing of the agent is increased up to 200° C. or higher.

In the case of the above-described photosensitive thermoplastic resin composition containing the ultraviolet crosslinking agent and the thermoplastic polymer, when the mixture of the ingredients are prepared by premixing at 130° C. or lower, the composition can be melt-molded at 200° C. or lower to provide a molded product having a desired shape. Further, by crosslinking of the molded product by ultraviolet irradiation, strength of the molded product is increased, and thus heat deformation of the molded product at the Tg of the thermoplastic polymer or higher is suppressed.

In the photosensitive thermoplastic resin composition in which the thermoplastic polymer (A) and the ultraviolet crosslinking agent (B) are premixed, the ultraviolet crosslinking agent is dispersed in the thermoplastic polymer in a state where the composition is not irradiated with ultraviolet. The premixed photosensitive thermoplastic resin composition may be prepared in a desired shape such as a powder or a pellet. The photosensitive thermoplastic resin composition may be used as a raw material for various melt-molding processes such as extrusion molding, compress ion molding, and injection molding.

The thermoplastic polymer (A) preferably has a polar structure in the molecular structure thereof. The polar structure consists of atom(s) other than carbon and hydrogen, such as oxygen, nitrogen, sulfur, and halogens. Specific examples of the polar structure include a (thio) ester, a (thio)ether, a (thio)carbonyl, a (thio)amide bond, and a structure having a halogen atom in a side chain.

Examples of the thermoplastic polymer having the polar structure include a methacrylic resin, a vinyl chloride resin, an acrylonitrile-butadiene-styrene copolymer (ABS resin), an ethylene-vinyl acetate copolymer (EVA resin), a polyamide resin, a polyurethane resin, and an alloy resin thereof.

The photosensitive thermoplastic resin composition without ultraviolet irradiation (i.e., without being cured) is in a state of sol in which the ultraviolet crosslinking agent is dispersed in the thermoplastic polymer having the polar structure. The ultraviolet crosslinking agent is a polar material because the agent contains a polar compound such as an (meth)acrylate having a polar structure such as an ester bond. Thus, the polar portion of the ultraviolet cross linking agent is weakly bonded to the polar structure of the thermoplastic polymer via a bond such as a hydrogen bond. The weak bonding between the thermoplastic polymer and the ultraviolet crosslinking agent increases the stability of the ultraviolet crosslinking agent.

A basic composition for a specific ultraviolet crosslinking agent (B) contains (B-i) a (meth)acrylate compound (hereinafter, sometimes referred to simply as a (meth)acrylate) such as a liquid radical-reactive monomer or oligomer containing a (meth)acrylate group, (B-ii) a photopolymerization initiator, and (B-iii) a chain transfer agent; however, any composition in which radical polymerization is initiated by ultraviolet irradiation may be used as the ultraviolet crosslinking agent (B). It should be noted that the term "(meth)acrylate" refers to both a methacrylate and an acrylate in the present invention.

According to the principle of the radical polymerization or crosslinking in the ultraviolet crosslinking agent, the photopolymerization initiator absorbs the ultraviolet light, and thereby generates an activated species such as a radical species. Then, the activated species radically polymerizes and crosslinks carbon-carbon double bonds contained in the polymer or in the (meth)acrylate.

Hereinafter, a detailed description of the ultraviolet crosslinking agent will be provided. The (meth)acrylate (B-i) is not limited specifically as long as the containing one or more (meth)acrylate group in the molecular structure thereof. Thus, a conventionally known (meth)acrylate compound can be used.

Specific examples of the (meth)acrylate include mono (meth)acrylate such as isobornyl(meth)acrylate, bornyl (meth)acrylate, tricyclodecanyl(meth)acrylate, dicyclopentanyl(meth)acrylate, dicyclopentenyl(meth)acrylate, cyclohexyl(meth)acrylate, (meth)acrylic acid, benzyl(meth) acrylate, 4-butylcyclohexyl(meth)acrylate, (meth)acryloylmorpholine, 2-hydroxyethyl(meth)acrylate, 2-hydroxypropyl(meth)acrylate, 4-hydroxybutyl(meth)acrylate, methyl (meth)acrylate, ethyl(meth)acrylate, propyl(meth)acrylate, isopropyl(meth)acrylate, octyl(meth)acrylate, isooctyl (meth)acrylate, nonyl(meth)acrylate, decyl(meth)acrylate, isodecyl(meth)acrylate, undecyl(meth)acrylate, dodecyl (meth)acrylate, lauryl(meth)acrylate, stearyl(meth)acrylate, isostearyl(meth)acrylate, tetrahydrofurfuryl(meth)acrylate, poly(ethylene glycol) mono(meth)acrylate, polypropylene glycol) mono(meth)acrylate, methoxyethylene glycol (meth)acrylate, ethoxyethyl(meth)acrylate, methoxypolyethylene glycol (meth)acrylate, methoxypolypropylene glycol (meth)acrylate, polyoxyethylene nonylphenyl ether acrylate, diacetone (meth)acrylamide, isobutoxymethyl (meth)acrylamide, N,N-dimethyl(meth)acrylamide, t-octyl (meth)acrylamide, dimethylaminoethyl(meth)acrylamide, diethylaminoethyl(meth)acrylate, 7-amino-3,7-dimethyloctyl(meth)acrylate, N,N-diethyl(meth)acrylamide, and N,N-dimethyl aminopropyl(meth)acrylamide; and a poly(meth) acrylate such as butanediol di(meth)acrylate, hexanediol di(meth)acrylate, nonanediol di(meth)acrylate, decanediol di(meth)acrylate, 2-butyl-2-ethyl-1,3-propanediol di(meth) acrylate, 2-hydroxy-3-acryloyloxy propyl methacrylate, dipropylene glycol di(meth)acrylate, tripropylene glycol di(meth)acrylate, triethylene glycol di(meth)acrylate, tetraethylene glycol di(meth)acrylate, tricyclodecane dimethylol di(meth)acrylate, 1,4-butanepolyol di(meth))acrylate, 1,6-hexanepolyol di(meth)acrylate, neopentyl glycol di(meth) acrylate, polyethylene glycol di(meth)acrylate, polypropylene glycol di(meth)acrylate, 9,9-bis[4-(2-acryloyloxyethoxy)phenyl]fluorine, polyester di(meth) acrylate, tris(2-hydroxyethyl) isocyanurate tri(meth) acrylate, tris-(2-hydroxyethyl) isocyanurate di(meth) acrylate, tricyclodecane dimethylol di(meth)acrylate, an EO adduct of bisphenol A di(meth)acrylate, an EO adduct or a PO adduct of hydrogenated bisphenol A di(meth)acrylate, an epoxy(meth)acrylate obtained by addition of a (meth)acrylate to diglycidylether of bisphenol A, trimethylolpropane tri(meth)acrylate, pentaerythritol tri(meth)acrylate, trimethylolpropane EO adduct of tri(meth)acrylate, tris-acryloyloxyethyl phosphate, pentaerythritol tetra(meth)acrylate, tetrafurfuryl alcohol oligo(meth)acrylate, ethyl carbitol oligo (meth)acrylate, 1,4-butanediol oligo(meth)acrylate, 1,6-hexanediol oligo(meth)acrylate, trimethylolpropane oligo (meth)acrylate, pentaerythritol oligo(meth)acrylate, (poly) urethane (meth)acrylate, and (poly)butadiene (meth) acrylate. They may be used singly or in combination.

Specific examples of the photopolymerization initiator (B-ii) include 1-hydroxycyclohexyl phenyl ketone, 2,2-dimethoxy-2-phenylacetophenone, xanthone, fluorenone, benzaldehyde, fluorene, anthraquinone, ethylanthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzil dimethylketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethyl benzoyl diphenyl phosphine oxide, and bis-(2,6-dimethoxy benzoyl)-2,4,4-trimethylpentyl phosphine oxide. They may be used singly or in combination.

Examples of commercial products that may be used as the photopolymerization initiator (B-ii) include IRGACUREs 184, 369, 651, 500, 907, CGI1700, CGI1750, CGI1850, and CG24-61; DAROCUREs 1116 and 1173; LucirinTPO (all manufactured by BASF); and EBECRYL P36 (manufactured by UCB).

The chain transfer agent (B-iii) smoothly spreads activated species such as radical species in a composition during a photo-curing reaction, and thus enhances the efficiency of the curing reaction. Examples of the chain transfer agent include a compound having a sulfur atom in the molecular structure thereof such as a thiol compound; α-methylstyrene dimer; an n-mer of a methacrylic ester; a compound having an aromatic nitrogen atom such as a imidazole compound; and a complex of a compound containing one or more pieces of at least one kind selected from the group consisting of a urethane bond, a urea bond, and an isocyanate group and a metal-containing compound. Examples of commercial products that may be used as the chain transfer agent include 2-mercaptobenzimidazole and 2,4-diphenyl-4-methyl-1-pentene.

Containing the chain transfer agent (B-iii), the ultraviolet crosslinking agent serves to cure the composition even in a portion that the irradiation light such as ultraviolet does not reach (i.e., has a dark-portion curing property).

The ultraviolet crosslinking agent (B) is prepared by mixing of the (meth)acrylate compound (B-i), the photopolymerization initiator (B-ii), and the chain transfer agent (B-iii). A method for the mixing is not limited specifically, and the ingredients may be mixed at room temperature or under heating. A method in which the ingredients are sufficiently agitated or blended to be dissolved or uniformly dispersed in each other with the use of an agitation equipment such as a blender at an appropriate temperature under a reduced pressure or in an inert gas atmosphere such as a nitrogen atmosphere is preferably used.

The mass content ratio of the photopolymerization initiator (B-ii) to the ingredient (B-i) in the ultraviolet crosslinking agent is preferably within a range from (B-i):(B-ii)=100:0.001 to 100:10, and more preferably within a range from (B-i):(B-ii)=100:0.005 to 100:5. When the content of the photopolymerization initiator (B-ii) is too high, an insoluble material may be generated, or properties of the product may be impaired. On the other hand, when the content is too low, only a small amount of radicals are generated, and thus the crosslinking reaction may not be initiated.

The mass content ratio of the chain transfer agent (B-iii) to the ingredient (B-i) in the ultraviolet crosslinking agent is preferably within a range from (B-i):(B-iii)=90:10 to 10:90, and more preferably within a range of (B-i):(B-iii)=80:20 to 20:80. When the content of the chain transfer agent (B-iii) is too high, an insoluble material may be generated, or properties of the product may be impaired. On the other hand, when the content is too low, the ultraviolet crosslinking agent may not have a sufficient dark-portion curing property.

The photosensitive thermoplastic resin composition may further contain (C) various kinds of additives. Examples of the additives (C) include a stabilizer, a plasticizer, a sensitizer, a fungicide, and a dispersing agent.

Examples of the stabilizer include an antiaging agent, an antioxidant, a coloration inhibitor, and a dehydrating agent. Specific examples of the stabilizer include a hindered phenol compound, a hindered amine compound (antiaging agents); butylhydroxytoluene, butylhydroxyanisole, triphenyl phosphite (antioxidants); hydrotalcite, a long-chain alkyl carboxylic acid, a metal soap, a β-diketone derivative (coloration inhibitors); maleic anhydride, phthalic anhydride, benzophenonetetracarboxylic dianhydride, calcined lime, a carbodiimide derivative, and an acid chloride such as stearic acid chloride (dehydrating agents). A small amount of polymerization inhibitor such as methoquinone may also be used as the stabilizer. Examples of commercial products that may be used as the stabilizer include IRGANOX series (manufactured by BASF; antiaging agent), ADEKASTAB AC series, and Rup100 series (manufactured by ADEKA CORPORATION; coloration inhibitors).

Examples of the plasticizer include phthalate, trimellitate, adipate, sebacate, succinate, benzoate, pentaerythritol, oleate, acetylricinoleate, phosphate, and phosphite esters; lauric, stearic, and docosanoic acids; and paraffinic, naphthenic, and aromatic oils.

Examples of the sensitizer include dimethylformamide, N-methylpyrrolidone, triethylamine, diethylamine, N-methyldiethanolamine, ethanolamine, 4-dimethylaminobenzoic acid, methyl 4-dimethylamino benzoate, ethyl 4-dimethylamino benzoate, isoamyl 4-dimethylamino benzoate, and commercial products such as EBECRYL P102, 103, 104 and 105 (manufactured by UCB).

Examples of the dispersing agent include a surfactant such as polyoxyethylene nonylphenyl ether, and polyethylene glycol octylphenyl ether.

The additives may be used in combination, as appropriate.

The ultraviolet crosslinking agent (B) prepared as described above may be mixed in the thermoplastic polymer (A) or in a mixture of the thermoplastic polymer (A) and the additives (C), to provide the photosensitive thermoplastic resin composition.

When the ultraviolet crosslinking agent (B) is mixed in the thermoplastic polymer (A) or in a mixture of the thermoplastic polymer (A) and the additives (C), it is preferable, in order to inhibit self-curing reaction of the ultraviolet crosslinking agent (B) by heating on the subsequent melt-molding, that the ingredients (A), (B), and (C) are premixed at a temperature that is equal to or higher than the glass transition temperature Tg of the ingredient (A) and equal to or lower than 130° C., whereby the ultraviolet crosslinking agent (B) is swollen into the thermoplastic polymer (A).

The method for the premixing is not limited specifically and may be selected in accordance with the shape of the thermoplastic polymer (A); however, sufficient mixing with the use of a temperature-variable mixing equipment such as a blender and a Henschel mixer for 5 to 20 minutes is preferable. Swelling of the ultraviolet crosslinking agent into the thermoplastic polymer by the premixing increases the thermal stability of the ultraviolet crosslinking agent.

Increased thermal stability of the ultraviolet crosslinking agent prevents the thermal self-curing of the agent on the melt-molding, and thus prevents loss of softness of the composition and separation of a self-curing product.

When the thermoplastic polymer (A) has a relatively large particle shape such as a pellet, the premixture may be left for about one or two hours at a temperature around Tg+5° C.

The mass content ratio of the thermoplastic polymer (A) to the ultraviolet crosslinking agent is preferably within a range from (A):(B)=99:1 to 30:70, and more preferably within a range from (A):(B)=95:5 to 50:50. When the content of the ingredient (A) is too high, the relative content of the ingredient (B), which participates in the ultraviolet crosslinking, may be too low to provide sufficient crosslinking effect on the photoirradiation. Meanwhile, when the content of the ingredient (B) is too high, the content of the polymer that serves as a base material of a molded product is too low to provide a molded product appropriately.

In order to impart a function to the photosensitive thermoplastic resin composition, an additive may be added or mixed in the composition. The type of the additive is not limited specifically; however, it is preferable that the additive itself has high stability from the viewpoint of an intended purpose of the additive.

The amount of the additive that is added or mixed in the composition is not limited specifically, either; however, it is preferable that adding or mixing of the amount of the additive does not affect handling of the composition.

The photosensitive thermoplastic resin composition is melt-molded into an intended shape at an appropriate molding temperature of the thermoplastic polymer (A). The method for the molding is not limited specifically, and various melt-molding methods such as extrusion molding, compression molding, and injection molding may be used.

The photosensitive thermoplastic resin composition according to the preferred embodiment of the present invention is crosslinked by ultraviolet irradiation after melt-molded. Specifically, the composition is melt-molded into an intended shape, and then the entire portion of the composition is crosslinked by ultraviolet irradiation.

Any light such as visible light may be used for the irradiation for the crosslinking, as well as the ultraviolet light. A variety of conventionally known irradiation devices may be used for the ultraviolet irradiation. Conditions for the ultraviolet irradiation may be determined as appropriate in accordance with the shape of the molded product of the photosensitive thermoplastic resin composition. Since the composition contains the chain transfer agent, the photoirradiation causes crosslinking even in a portion of the molded product that is not directly irradiated with the light.

EXAMPLE

A description of the present invention will now be specifically provided with reference to examples and comparative examples; however, the present invention is not limited to the examples.

Thermoplastic polymers (A) used in Examples and Comparative Examples are listed below. Properties of the thermoplastic polymers are summarized in Table 1.

PVC (700): polyvinyl chloride (polymerization degree: 700), manuf.: TAIYO VINYL CORPORATION PVC (1000): polyvinyl chloride (polymerization degree: 1000), manuf.: TAIYO VINYL CORPORATION PMMA: poly(methylmethacrylate) (Mn=48000), manuf.: WAKO PURE CHEMICAL INDUSTRIES, LTD.

PP: polypropylene (Mn=50000), manuf.: SIGMA-ALDRICH CORPORATION

TABLE 1

| (A) Type of Thermoplastic Polymer | Properties of Polymer | | |
|---|---|---|---|
| | Tg [° C.] | Maximum Strength [MPa] | Elongation [%] |
| PVC (700) | 87 | 27 | 415 |
| PVC (1000) | 87 | 29 | 405 |
| PMMA | 99 | 43 | 310 |
| PP | 0 | 38 | 325 |

Table 2 shows Preparation Examples B-1 to B-4 of the ultraviolet crosslinking agent (B). To prepare the ultraviolet crosslinking agents according to Examples B-1 to B-4, the ingredients (B-i), (B-ii), and (B-iii) shown in Table 2 were mixed with an agitation equipment in the content ratios (in part by mass) shown in the table and were dissolved or dispersed in each other. The chain transfer agent (B-iii) was prepared by synthesis of a complex of a compound having a urethane bond and a metal-containing compound. Details of the synthesis of the complex are described later. With respect to the other ingredients, abbreviations described below are used in Tables 3-5. Reagents with no specific indication of manufacturers are reagent-grade products manufactured by TOKYO CHEMICAL INDUSTRY CO., LTD.

(Meth)Acrylates (B-i)

IBA: isobornyl acrylate

DPGA: dipropylene glycol diacrylate

TEGA: tetraethylene glycol diacrylate

TMPTA: trimethylolpropane EO triacrylate, manuf.: OSAKA ORGANIC CHEMICAL INDUSTRY LTD., trade name: "V#360"

Photopolymerization Initiator (B-ii)

HCHPK: 1-hydroxycyclohexyl phenyl ketone

Synthesis of Chain Transfer Agent (B-iii)

Synthesis Example 1

80 g (200 mmol) of polypropylene glycol having a number-average molecular weight of 400, 40 g (238 mmol) of hexamethylene diisocyanate, and 0.05 g of dibutyltin dilaurate were put in a reaction container with an agitation equipment, and the liquid temperature of the mixture was raised up to 50° C. from a room temperature in one hour while agitating the mixture. Then, while a small amount of the mixture was sampled for FT-IR measurement to check absorption of an isocyanate group in the vicinity of 2300 $cm^{-1}$, the agitation was continued at 50° C. The content of the residual isocyanate group was calculated based on the absorption area of FT-IR. The moment when the content decreased down to about 15% compared with the content before the reaction and no change was seen was regarded as an the completion of the preliminary reaction. Thus, a clear and colorless viscous liquid was obtained. Further, 9.84 g (84.7 mmol) of 2-hydroxyethyl acrylate and 0.02 g of pentaerythritol tetrakis[3-(3,5-di-tert-butyl-4-hydroxyphenyl)propianate] were put in the liquid, and the liquid temperature of the mixture was raised up to 50° C. from a room temperature in one hour while agitating the mixture. Then, while a small amount of the mixture was sampled to measure its FT-IR to check absorption of an isocyanate group in the vicinity of 2300 $cm^{-1}$, the agitation was continued at 50° C. The content of the residual isocyanate group was calculated based on the absorption area of FT-IR. The moment when the absorption disappeared was regarded as the completion of the reaction. Thus, 130 g of a clear and colorless viscous liquid containing a urethane bond was obtained. Further, 1.08 g of bis-(2,4-pentanedionato)zinc (II) was added into the compound, and the mixture was vigorously agitated at room temperature for 20 minutes. Thus, a complex of the compound containing a urethane bond and a metal-containing compound was obtained.

TABLE 2

| Composition of (B) Ultraviolet Crosslinking Agent | | Preparation Example | | | | |
|---|---|---|---|---|---|---|
| | | B-1 | B-2 | B-3 | B-4 | B-5 |
| (B-i) (Meth)acrylate | IBA | 60 | | | | |
| | DPGA | | 60 | | | |
| | TEGA | | | 60 | | |
| | TMPTA | | | | 60 | 95 |
| (B-ii) Photopolymerization Initiator | HCHPK | 1 | 1 | 1 | 1 | 1 |
| (B-iii) Chain Transfer Agent | | 40 | 40 | 40 | 40 | 5 |

Examples 1-14 and Comparative Examples 1-3

Tables 3 and 4 shows Examples using the thermoplastic polymer (A) in Table 1, the ultraviolet crosslinking agent (B) in Table 2, and other additives (C). Table 5 shows Comparative Examples. Photosensitive thermoplastic resin compositions according to Examples and Comparative Examples were prepared by premixing of the thermoplastic polymers (A), the ultraviolet crosslinking agents (B), and the other additives (C) shown in Tables 3-5, in the content ratios (in part by mass) shown in the tables, respectively. Properties such as moldability, crosslinkability, and heat deformability of the prepared compositions were evaluated. The evaluation results are shown in Tables 3-5. Abbreviations used in the tables, methods for the premixing and the evaluation of the properties are described below.

(C) Other Additives

Irg1010: IRGANOX1010, manuf. BASF, an antiaging agent

Rup-109: manuf.: ADEKA CORPORATION, a coloration inhibitor

DINP: diisononyl phthalate: a plasticizer

[Method for Premixing]

The thermoplastic polymers (A), the ultraviolet crosslinking agents (B), and the other additives (C) shown in Tables 3-5 were premixed in the content ratios (in part by mass) shown in the tables with an agitation equipment. The temperature during the premixing and the time for the premixing are also shown in the tables. Thus, compositions according to Examples and Comparative Examples were prepared.

[Evaluation of Moldability]

Each of the photosensitive thermoplastic resin compositions according to Examples and Comparative Examples was kneaded with the use of Labo Plastomill (manufactured by TOYO SEIKI KOGYO CO., LTD.) at 170° C. for 10 minutes. Then the kneaded product was hot-pressed with the use of Mini Test Press (manufactured by TOYO SEIKI KOGYO CO., LTD.), and thus a 0.2-mm thick molded sheet was obtained. The molded sheet was cut into a 10 mm×100 mm belt-shaped sample. A tensile test was conducted with the sample at a tensile speed of 20 mm/min. and the maximum strength (before ultraviolet irradiation) and elongation (before ultraviolet irradiation) of the sample were measured.

The photosensitive thermoplastic resin composition needs to maintain the moldability of the thermoplastic polymer (A) contained in the composition to some extent. If the composition has good moldability, the molded product that is produced with the use of Labo Plastomill and Mini Test Press as described above presumably has properties that are not greatly deviated from the properties of the thermoplastic polymer alone. On the other hand, if the composition has bad moldability, hardening or separation occurs in the composition on the molding with the use of Labo Plastomill and Mini Test Press, and thus the molded product may be extremely inferior in either or both of the maximum strength and the elongation to the thermoplastic polymer alone. If both the maximum strength and the elongation of the photosensitive thermoplastic resin composition after the molding are equal to or larger than 70% of the values of the thermoplastic polymer alone, the composition is regarded as having sufficient maximum strength and elongation.

Therefore, in the evaluation of the moldability, if the molded sheet prepared by the method described above had maximum strength and elongation before the ultraviolet irradiation that is equal to or larger than 70% of those of the thermoplastic polymer alone that is contained in the composition, the composition was regarded as good. If at least one of the evaluation criteria was not met, the composition was regarded as bad. The maximum strength and elongation of the thermoplastic polymer alone that is used in Examples shown in Tables 3 and 4 are presented in Table 5.

[Evaluation of Crosslinkability]

Each of the molded sheets made of the photosensitive thermoplastic resin compositions that was used for the above-described evaluation of the moldability was irradiated with ultraviolet on the surfaces thereof for 20 seconds with the use of a UV lamp (100 mW/cm$^2$, manufactured by SEN LIGHTS CO., LTD.), and was thereby crosslinked. For the sheet after crosslinked, the tensile test was conducted with the same conditions as used in the evaluation of the moldability described above, and maximum strength (after ultraviolet irradiation) and elongation (after ultraviolet irradiation) were measured for the sheet.

If the photosensitive thermoplastic resin composition is cross linked by the ultraviolet irradiation, the number of intermolecular bonds in the resin is increased, and thus the maximum strength is increased. Further, the increase of the intermolecular bonds limits the degree of freedom for motion of polymer chains, and thus the elongation of the composition is decreased to some extent. Therefore, in order to evaluate the crosslinkability of the composition, the composition was regarded as good if the maximum strength was increased and the elongation was decreased by the ultraviolet irradiation. If at least one of the evaluation criteria was not met, the sheet was regarded as bad.

[Evaluation of Heat Deformability]

Figure 2:
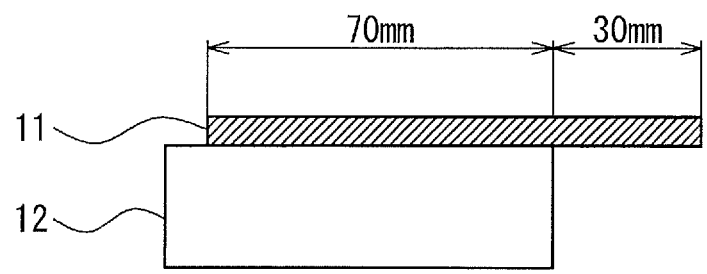
FIG. 2 is an illustration showing a method for testing heat deformability.

The ultraviolet irradiated molded sheet made of the photosensitive thermoplastic resin composition that was used in the above-described evaluation of the crosslinkability was cut into a 10 mm wide×100 mm long belt-shaped sample. FIG. 2 is an illustration showing a method for evaluating heat deformability of the sheet. The sample 11 of the molded sheet was fixed on a fixing base 12 made of copper, as shown in FIG. 2. A 30-mm long terminal portion of the sample 11 was set out of the fixing base 12. The sample 11 and the base 12 were heated together at 180° C. for 5 minutes. Then, it was examined by visual observation whether the portion of sample 11 set out of the fixing base 12 was hung down by the own weight thereof due to heat deformation. If the terminal portion was not hung down, the composition was regarded as good (i.e., having a good resistance to heat deformation). If the terminal portion was hung down, the composition was regarded as bad (i.e., having a bad resistance to heat deformation).

TABLE 3

| | | | Example | | | | | | |
| --- | --- | --- | --- | --- | --- | --- | --- | --- | --- |
| | | | 1 | 2 | 3 | 4 | 5 | 6 | 7 |
| (A) Thermoplastic Polymer | | PVC (700) | 90 | | | | | | |
| | | PVC (1000) | | 90 | | 90 | 90 | 90 | 90 |
| | | PMMA | | | 90 | | | | |
| | | PP | | | | | | | |
| (B) Ultraviolet Crosslinking Agent | | B-1 | | | | 10 | | | |
| | | B-2 | | | | | 10 | | |
| | | B-3 | | | | | | 10 | |
| | | B-4 | 10 | 10 | 10 | | | | |
| | | B-5 | | | | | | | 10 |
| (C) Other Additive | Antiaging Agent | Irg1010 | 0.1 | 0.1 | 0.1 | 0.1 | 0.1 | 0.1 | 0.1 |
| | Coloration Inhibitor | Rup-109 | 1 | 1 | 1 | 1 | 1 | 1 | 1 |
| | Plasticizer | DINP | 10 | 10 | 10 | 10 | 10 | 10 | 10 |

TABLE 3-continued

|  |  |  | Example |  |  |  |  |  |  |
|---|---|---|---|---|---|---|---|---|---|
|  |  |  | 1 | 2 | 3 | 4 | 5 | 6 | 7 |
|  | Temperature during Premixing [° C.] |  | 90 | 90 | 110 | 90 | 90 | 90 | 90 |
|  | Time for Premixing [min.] |  | 10 | 10 | 10 | 10 | 10 | 10 | 10 |
| Moldability | Before UV | Max. Strength [MPa] | 24 | 26 | 38 | 27 | 29 | 26 | 30 |
|  | Irradiation | Elongation [%] | 411 | 432 | 325 | 443 | 440 | 422 | 407 |
|  |  | Evaluation Result | Good | Good | Good | Good | Good | Good | Good |
| Crosslinkability | After UV | Max. Strength [MPa] | 40 | 56 | 73 | 55 | 61 | 58 | 65 |
|  | Irradiation | Elongation [%] | 324 | 333 | 210 | 323 | 296 | 266 | 233 |
|  |  | Evaluation Result | Good | Good | Good | Good | Good | Good | Good |
| Heat Deformability |  | Evaluation Result | Good | Good | Good | Good | Good | Good | Good |

TABLE 4

|  |  |  | Example |  |  |  |  |  |  |
|---|---|---|---|---|---|---|---|---|---|
|  |  |  | 8 | 9 | 10 | 11 | 12 | 13 | 14 |
| (A) Thermoplastic Polymer |  | PVC (700) |  |  |  |  |  |  |  |
|  |  | PVC (1000) | 99 | 50 |  |  | 90 | 90 | 90 |
|  |  | PMMA |  |  |  |  |  |  |  |
|  |  | PP |  |  | 90 | 90 |  |  |  |
| (B) Ultraviolet Crosslinking Agent |  | B-1 |  |  |  |  |  |  |  |
|  |  | B-2 |  |  |  | 10 |  |  |  |
|  |  | B-3 |  |  |  |  |  |  |  |
|  |  | B-4 | 1 | 50 | 10 | 10 | 10 | 10 | 10 |
|  |  | B-5 |  |  |  |  |  |  |  |
| (C) Other Additive | Antiaging Agent | Irg1010 | 0.1 | 0.1 | 0.1 | 0.1 | 0.1 | 0.1 | 0.1 |
|  | Coloration Inhibitor | Rup-109 | 1 | 1 | 1 | 1 | 1 | 1 | 1 |
|  | Plasticizer | DINP | 10 | 10 | 10 | 10 | 10 | 10 | 10 |
|  | Temperature during Premixing [° C.] |  | 90 | 90 | 90 | 90 | 90 | 50 | 150 |
|  | Time for Premixing [min.] |  | 10 | 10 | 10 | 10 | 10 | 10 | 10 |
| Moldability | Before UV | Max. Strength [MPa] | 32 | 22 | 34 | 36 | 30 | 32 | 35 |
|  | Irradiation | Elongation [%] | 375 | 419 | 320 | 316 | 234 | 385 | 359 |
|  |  | Evaluation Result | Good | Good | Good | Good | Good | Good | Good |
| Crosslinkability | After UV | Max. Strength [MPa] | 42 | 79 | 42 | 41 | 38 | 35 | 38 |
|  | Irradiation | Elongation [%] | 299 | 190 | 271 | 224 | 190 | 331 | 336 |
|  |  | Evaluation Result | Good | Good | Good | Good | Good | Good | Good |
| Heat Deformability |  | Evaluation Result | Good | Good | Good | Good | Good | Good | Good |

TABLE 5

|  |  |  | Comparative Example |  |  |
|---|---|---|---|---|---|
|  |  |  | 1 | 2 | 3 |
| (A) Thermoplastic Polymer |  | PVC (700) | 100 |  |  |
|  |  | PVC (1000) |  | 100 |  |
|  |  | PMMA |  |  | 100 |
| (B) Ultraviolet Crosslinking Agent |  | None | — | — | — |
| (C) Other Additive | Antiaging Agent | Irg1010 | 0.1 | 0.1 | 0.1 |
|  | Coloration Inhibitor | Rup-109 | 1 | 1 | 1 |
|  | Plasticizer | DINP | 10 | 10 | 10 |
| Temperature during Premixing [° C.] |  |  | — | — | — |
| Time for Premixing [min.] |  |  | 0 | 0 | 0 |
| Moldability | Before UV Irradiation | Max. Strength [MPa] | 28 | 42 | 38 |
|  |  | Elongation [%] | 401 | 310 | 325 |
|  |  | Evaluation Result | Good | Good | Good |
| Crosslinkability | After UV Irradiation | Max. Strength [MPa] | 26 | 42 | 38 |
|  |  | Elongation [%] | 403 | 312 | 327 |
|  |  | Evaluation Result | Bad | Bad | Bad |
| Heat Deformability |  | Evaluation Result | Bad | Bad | Bad |

[Evaluation Results]

The compositions according to Comparative Examples 1-3, which are shown in Table 5, do not contain the ultraviolet crosslinking agent (B). Accordingly, the maximum strengths were not increased by the ultraviolet irradiation, and the elongations were kept almost unchanged before and after the ultraviolet irradiation. These results indicate that crosslinking did not occur in the compositions. Further, the compositions had bad resistances to heat deformation due to the absence of the crosslinking.

Meanwhile, in the compositions according to Examples 1-14, which are shown in Tables 3 and 4, the ultraviolet crosslinking agents (B) are thermally stabilized by the premixing with the thermoplastic polymers (A). Thus, the compositions had good moldability before the ultraviolet irradiation. Further, the strengths thereof were increased by the ultraviolet irradiation while the elongations thereof were decreased to some extent by the irradiation. These results indicate that crosslinking occurred in the compositions by the irradiation. In addition, no heat deformation was observed for the compositions according to Examples 1-14. Therefore, it was evidenced that crosslinking occurred in the photosensitive thermoplastic resin compositions according to Examples 1-14 by ultraviolet irradiation.

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

The invention claimed is:

1. A photosensitive thermoplastic resin composition comprising:
    a thermoplastic polymer; and
    a photocrosslinking agent compatible with the thermoplastic polymer,
    the composition being melt-moldable, and a melt-molded product of the composition being crosslinkable by photoirradiation,
    wherein the photocrosslinking agent comprises:
    a (meth)acrylate compound;
    a photopolymerization initiator; and
    a chain transfer agent,
    wherein the chain transfer agent is a complex compound that contains:
        at least one selected from the group consisting of a urethane bond, a urea bond, and an isocyanate group, and
        a metal-containing compound.

2. The photosensitive thermoplastic resin composition according to claim 1, wherein the thermoplastic polymer and the photocrosslinking agent are mixed at a temperature that is equal to or higher than a glass transition temperature of the thermoplastic polymer and equal to or lower than 130° C., and the photocrosslinking agent is stabilized.

3. The photosensitive thermoplastic resin composition according to claim 2, wherein the thermoplastic polymer has a polar structure.

4. The photosensitive thermoplastic resin composition according to claim 3, wherein a mass content ratio of the thermoplastic polymer to the photocrosslinking agent is in a range from 99:1 to 30:70.

5. A molded product, the product being made by melt-molding of the photosensitive thermoplastic resin composition according to claim 4 into a given shape, and being photocrosslinkable.

6. A molded product, the product being made by melt-molding of the photosensitive thermoplastic resin composition according to claim 4 into a given shape and by subsequent photopolymerization of the composition.

7. The photosensitive thermoplastic resin composition according to claim 1, wherein the thermoplastic polymer has a polar structure.

8. The photosensitive thermoplastic resin composition according to claim 1, wherein a mass content ratio of the thermoplastic polymer to the photocrosslinking agent is in a range from 99:1 to 30:70.

9. A molded product, the product being made by melt-molding of the photosensitive thermoplastic resin composition according to claim 1 into a given shape, and being photocrosslinkable.

10. A molded product, the product being made by melt-molding of the photosensitive thermoplastic resin composition according to claim 1 into a given shape and by subsequent photopolymerization of the composition.

* * * * *